US011138501B2

(12) United States Patent
Abel et al.

(10) Patent No.: US 11,138,501 B2
(45) Date of Patent: Oct. 5, 2021

(54) HARDWARE-IMPLEMENTED TRAINING OF AN ARTIFICIAL NEURAL NETWORK

(71) Applicant: International Business Machines Corporation, Armonk, NY (US)

(72) Inventors: Stefan Abel, Zurich (CH); Veeresh Vidyadhar Deshpande, Zurich (CH); Jean Fompeyrine, Zurich (CH); Abu Sebastian, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 884 days.

(21) Appl. No.: 15/902,599

(22) Filed: Feb. 22, 2018

(65) Prior Publication Data
US 2019/0258926 A1    Aug. 22, 2019

(51) Int. Cl.
*G06N 3/08* (2006.01)
*G06N 3/04* (2006.01)
*G06N 3/063* (2006.01)

(52) U.S. Cl.
CPC .............. *G06N 3/08* (2013.01); *G06N 3/04* (2013.01); *G06N 3/0635* (2013.01)

(58) Field of Classification Search
CPC .......... G06N 3/08; G06N 3/04; G06N 3/0635
See application file for complete search history.

(56) References Cited

U.S. PATENT DOCUMENTS

| 5,455,891 A | * | 10/1995 | Hirotsu | G06N 3/08 706/25 |
| 2004/0015459 A1 | * | 1/2004 | Jaeger | G06N 3/08 706/15 |
| 2017/0017879 A1 | | 1/2017 | Kataeva et al. | |
| 2018/0330236 A1 | * | 11/2018 | Hou | G06N 3/088 |

FOREIGN PATENT DOCUMENTS

JP     3273568 B2 *  4/2002

OTHER PUBLICATIONS

Deep Learning with Coherent Nanophotonic Circuits, Shen, Yichen et al., vol. 11, pp. 441-446, Nature Photonics, 2017 (Year: 2017).*

(Continued)

*Primary Examiner* — Li B. Zhen
*Assistant Examiner* — Selene A. Haedi
(74) *Attorney, Agent, or Firm* — Harrington & Smith

(57) ABSTRACT

A method for hardware-implemented training of a feedforward artificial neural network is provided. The method comprises: generating a first output signal by processing an input signal with the network, wherein a cost quantity assumes a first cost value; measuring the first cost value; defining a group of at least one synaptic weight of the network for variation; varying each weight of the group by a predefined weight difference; after the variation, generating a second output signal from the input signal to measure a second cost value; comparing the first and second cost values; and determining, based on the comparison, a desired weight change for each weight of the group such that the cost function does not increase if the respective desired weight changes are added to the weights of the group. The desired weight change is based on the weight difference times −1, 0, or +1.

19 Claims, 5 Drawing Sheets

(56) References Cited

OTHER PUBLICATIONS

Saumil Girish Merchant "Intrinsically Evolvable Artificial Neural Networks" University of Tennessee, Knoxville. http://trace.tennessee.edu/cgi/viewcontent.cgi?article=1295&context=utk_graddiss [retrieved Feb. 23, 2018].

D Soudry et al. "Memristor-based Multilayer Neural Networks with Online Gradient Descent Training" IEEE Transactions on Neural Networks and Learning Systems, vol. 26, Issue 10, Oct. 2015. IEEE Explore.

R. Rezvani et al. "A New Method for Hardware Design of Multi-Layer Perceptron Neural Networks with Online Training" 11th International Conference on Cognitive Informatics and Cognitive Computing, 2012. https://pdfs.semanticscholar.org/2c02/9c757a0bba5d81cea50eddf4822fb63bdcf9.pdf [retrieved Feb. 23, 2018].

* cited by examiner

HARDWARE-IMPLEMENTED TRAINING OF AN ARTIFICIAL NEURAL NETWORK

BACKGROUND

The present invention relates to artificial neural networks implemented in hardware systems, and more particularly, to the training of hardware-implemented artificial neural networks.

The hardware implementation of artificial neural networks (ANNs) is the subject of ongoing research in computational optics and electronics. One issue of hardware implementation is the training of ANNs, i.e. the calculation and update of the synaptic weights of the connections between the neurons of the artificial neural network. Among the most popular and efficient ways to train ANNs is the back propagation (BP) algorithm, for which a full hardware implementation is still missing. Instead, the current state of the art provides a so called 'offline training' of the synaptic weights, wherein an output of a hardware implemented neural network is transferred to a conventional computing system, the computing system performs a software implemented training algorithm (e.g. back propagation) on that output while the ANN is halted, the synaptic weights are updated with the optimized weights calculated with the software implemented training algorithm, and the operation of the ANN is continued. Such intermittent ANN operation, and also the described offline training, which is usually slow compared to the computational capabilities of the ANN, are circumstances which prevent the computational efficiency of hardware implemented ANNs from reaching orders of magnitude which are expected by theory.

SUMMARY

It is an objective of the present invention to provide for a method for hardware implemented training of a feed forward artificial neural network as well as a neuromorphic training system implementing said methods. Embodiments of the invention are given in the dependent claims. Embodiments of the present invention can be freely combined with each other if they are not mutually exclusive.

In one aspect, the invention relates to a method for hardware-implemented training of a feedforward artificial neural network, wherein the method comprises:

generating a first output signal of the artificial neural network by processing an input signal with the artificial neural network, the first output signal causing a cost quantity of the artificial neural network to assume a first cost value;

measuring the first cost value;

defining a group of at least one synaptic weight of the artificial neural network for variation;

varying each synaptic weight of the group by a predefined weight difference;

after the variation, generating a second output signal of the artificial neural network by repeating the processing of the input signal, the second output signal causing the cost quantity to assume a second cost value;

measuring the second cost value;

comparing the second cost value to the first cost value; and executing a training processing, the training processing comprising determining, based on the comparison, a desired weight change for each synaptic weight of the group such that the cost function does not increase if, for each synaptic weight of the group, the respective desired weight change is added to the synaptic weight, the desired weight change being based on a product of a factor and the weight difference, the factor being either −1, 0, or +1.

In a further aspect, the invention relates to a neuromorphic training system, wherein the system comprises a feedforward artificial neural network and a control unit for training the artificial neural network, the control unit being communicatively coupled to an output of the artificial neural network and being adapted for performing the following:

receiving a first output signal from the output, the first output signal being generated by processing an input signal with the artificial neural network, the first output signal causing a cost quantity of the artificial neural network to assume a first cost value;

measuring the first cost value;

defining a group of at least one synaptic weight of the artificial neural network for variation;

varying each synaptic weight of the group by a predefined weight difference;

after the variation, receiving a second output signal from the output, the second output signal being generated by repeating the processing of the input signal, the second output signal causing the cost quantity to assume a second cost value;

measuring the second cost value;

comparing the second cost value to the first cost value; and executing a training processing, the training processing comprising determining, based on the comparison, a desired weight change for each synaptic weight of the group such that the cost function does not increase if, for each synaptic weight of the group, the respective desired weight change is added to the synaptic weight, the desired weight change being based on a product of a factor and the weight difference, the factor being either −1, 0, or +1.

BRIEF DESCRIPTION OF THE SEVERAL VIEWS OF THE DRAWINGS

In the following, embodiments of the invention are explained in greater detail, by way of example only, making reference to the drawings in which.

DETAILED DESCRIPTION

Figure 1:
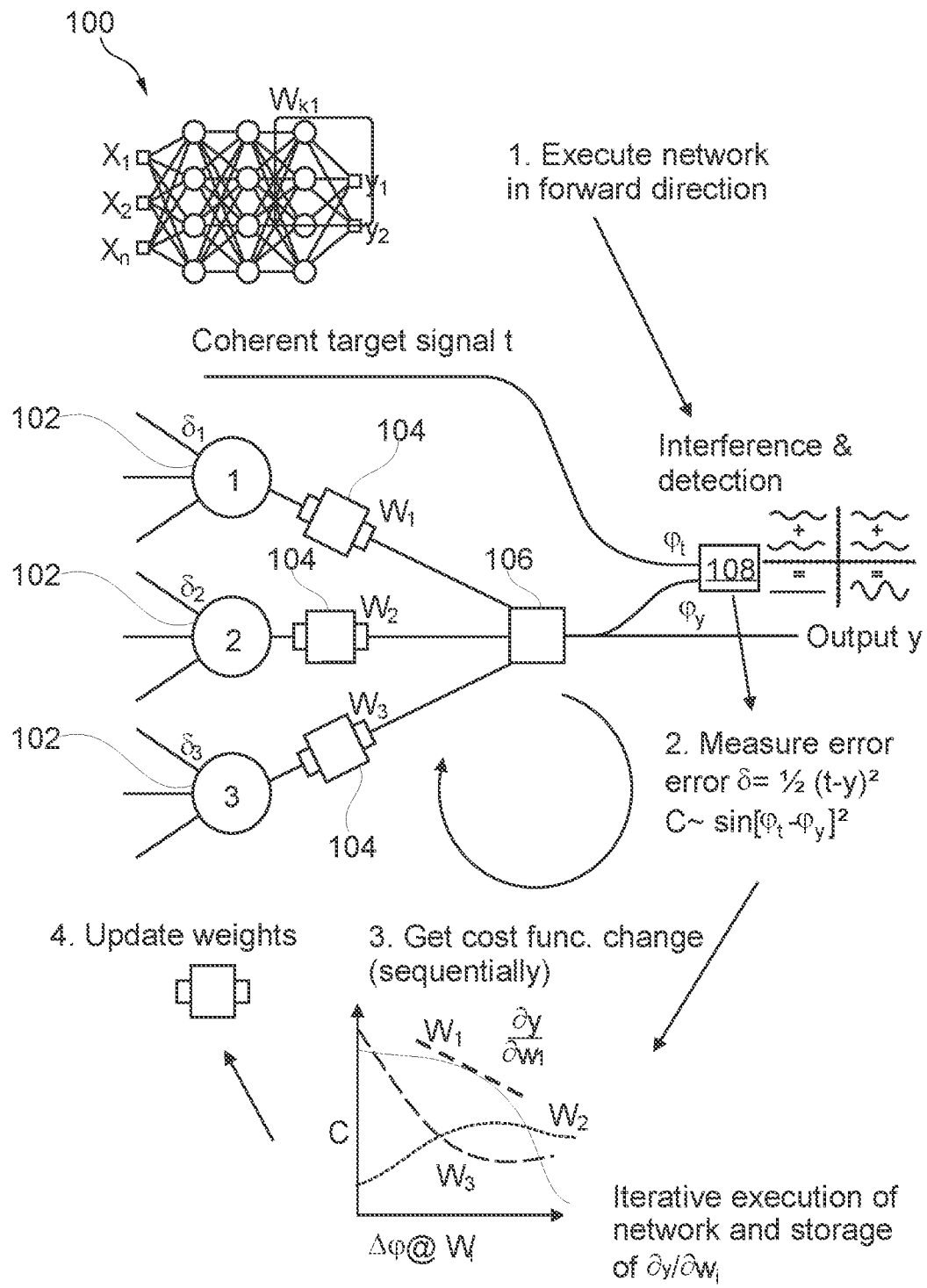
FIG. 1 schematically illustrates the method with an optical neural network.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention relates to the technical field of artificial neural networks and may be applied to any current implementation technology of an artificial neural network, such as an optical neural network (ONN), a resistive neural network (ReNN), etc.

A feedforward artificial neural network shall be trained such that the trained network produces a desired output in response to receiving and processing a predefined input. It is desirable to provide the artificial neural network (ANN) with a minimal extension, using the same signal processing technology as the ANN, to enable an online training of the ANN, i.e. an iterative calculation or determination of update values to the synaptic weights by the extension such that the deviation between the output of the ANN and the desired output decreases iteratively, in order to improve the computational efficiency of the ANN.

The method for hardware implemented training of a feedforward artificial neural network disclosed herein is not an implementation of the back propagation algorithm, but uses an alternative approach for determining the changes to the synaptic weights $w_i$ which are expected for a given iteration to yield a closer convergence of the output of the ANN with the desired output. Commonly, a weight update is based on a determination of the direction of steepest decent of the cost function C, which involves a calculation of the partial derivatives $\partial C/\partial w_i$. Training algorithms like the back propagation algorithm allow an estimation of these partial derivatives, and hence of the weight changes needed to minimize the cost function, which is a function of the deviation of the values encoded by the neuron elements of the output layer of the artificial neural network.

Instead, the necessary changes of the synaptic weights for minimizing the cost function are determined by variation of the synaptic weights according to embodiments of the present invention. A predefined weight difference is added to or subtracted from each weight of a group of synaptic weights defined for the variation. In an example, the group of varied synaptic weights comprises all synaptic weights interfacing two layers of the ANN, e.g. a hidden layer and the output layer. In another example, the group comprises a subset of the synaptic weights in that layer, and the training of the synaptic weights in that layer is performed by subsequent variation of synaptic weights grouped into disjunct subsets. In yet another example, the group comprises one synaptic weight and the training is performed by subsequent variation of a single weight.

A fully hardware implemented training of the feedforward ANN may be enabled by a cost function which is available as a measurable quantity on hardware level which encodes the deviation, or error, of each value encoded by the respective neuron element of the output layer from its respective desired target value. In an example, the cost function is proportional to the sum of squared differences of the output neuronal values from their respective target values, wherein the sum runs over all neuron elements of the output layer. In an optical neural network, the cost function may, for instance, be encoded by the amplitude and/or phase of a suitable interference signal, e.g. as discussed further below for the implementation shown in FIG. 1. In a resistive ANN, the cost function may, for instance, be determined from one or more output current(s), e.g. by a suitable integrator/comparator circuit as discussed further below for the implementation shown in FIG. 2.

According to embodiments, the measurement comprises interfering the output signal with a coherent target signal, the cost quantity comprising the power of the interference signal. This may have the advantage that a quantity which is equivalent to the error and/or the cost function can be directly measured, without analyzing and subsequently comparing output and target signal. This may simplify the setup, as no dedicated hardware is necessary to provide capability for said subsequent analysis and comparison, and the method may be performed in shorter time as the error and/or cost function may be determined in a single step instead of a number of subsequent steps.

The hardware implemented training according to embodiments of the invention is performed in three major steps. First, the ANN is prepared in an initial state to process a reproducible input signal to a first output signal. This first output signal corresponds to a first cost value of the measurable cost function, which may also be called cost quantity. In the second major step, the at least one synaptic weight within the group defined for variation is varied by adding or subtracting the predefined weight difference. In response to providing the identical input signal to the artificial neural network comprising the varied synaptic weight, the ANN generates a second output signal corresponding to a second cost value of the cost function. The first and the second cost value are measured after the respective processing of the input signal. In the third major step, the measured cost values are compared and, based on the result of the comparison, a desired weight change is determined for each synaptic weight of the group. The desired weight change is the positive or negative absolute value of the predefined weight difference, or zero in the case that neither increasing or decreasing the respective synaptic weights is supposed to decrease the cost function. The determined desired weight change may subsequently be cached for later use or added to the respective varied synaptic weight in order to perform the update.

If the group defined for variation comprises more than one synaptic weight, a variation can be performed in different ways or schemes. In one example, all synaptic weights of the group are varied in the same direction, e.g. by the negative absolute value of the predefined weight difference. In another example, the synaptic weights of the group are varied according to a predefined pattern. In yet another example, the direction or time of variation is random for each synaptic weight of the group. In a further example, the direction of variation is guessed as the direction which may yield a reduction of the cost function with the highest probability. Such guessed or estimated variation direction may accelerate the minimization of the cost function.

The disclosed method may have the advantage that no computing system is needed external to the artificial neural network for calculating update values for the synaptic weights. This may simplify the setup of the artificial neural network. Furthermore, the method may accelerate the training process as no time is needed for transferring the synaptic weights back and forth between the artificial neural network and an external weight update computation system, and additionally, if the signal processing technology of the artificial neural network is faster than that of an external weight update computing system. A further increase of training efficiency may be possible as the method allows for parallel synaptic weight updating.

According to embodiments, the training is performed for a sequence of at least two groups of synaptic weights, the sequence being defined such that the variation of the synaptic weights of a group subsequent to a given group is performed after the execution of the training processing for the synaptic weights of the given group, the training processing further comprising, for each synaptic weight of the group:

in case the second cost value is smaller than the first cost value, setting the factor to +1;

caching the respective desired weight change; and restoring the respective synaptic weight, the method further comprising, upon completion of the training processing for all synaptic weights of the group, adding the determined desired weight change to the respective synaptic weight for each synaptic weight of the group.

A sequential variation of groups of synaptic weights may be beneficial if the processing capacity for determining the weight update is limited. In this case, the maximum number of synaptic weights per group can be limited to the capacity of the respective units responsible for determining the desired weight changes. In addition, a sequential training may be advantageous to determine the influence of a particular group of synaptic weights on the cost function independent of the remaining synaptic weights to be trained. As an example, one may group all synaptic weights of connections of neuron elements of a preceding layer of the ANN with a particular neuron element of the given layer. This way, the influence of each neuron element of the given layer on the cost function may be examined separately.

After completion of the training processing, the determined desired weight changes are added to the synaptic weights of the group. In particular, this may be done before the method continues to train a subsequent group. This may accelerate the training process further, especially if the influence of the groups on the cost function is independent or merely weakly correlated.

According to embodiments, the adding is delayed until the training processing is completed for the last group in the sequence. This may beneficially prevent mistakes during finding the minimum of the cost function if the synaptic weights are strongly correlated. In this case, an independent evaluation of the group's influence on the cost function usually yields a different result than if the groups were varied and updated subsequently.

According to embodiments, the training processing further comprises, in case the second cost value is not smaller than the first cost value:

for each synaptic weight of the group, varying the respective restored synaptic weight by the predefined weight difference in negative direction;

generating a third output signal of the artificial neural network by repeating the processing of the input signal, the third output signal causing the cost quantity to assume a third cost value;

measuring the third cost value;

in case the third cost value is smaller than the first cost value, setting the factor to −1 for each synaptic weight of the group; and in case the third cost value is not smaller than the first cost value, setting the factor to zero for each synaptic weight of the group.

If the first variation did not result in a decrease of the cost function, it may be beneficial to check whether a reversal of the variation directions actually yields the desired reduction of the cost function. The second variation also includes the possibility that a reduction of the cost function can be achieved neither with the variation in positive direction, nor with the variation in negative direction. In this case, the method provides for the possibility to set the factor to zero. This may improve the stability of the training procedure because the update is not enforced if this is not feasible.

According to embodiments, the caching is performed using a delay line, the adding comprising receiving the cached desired weight change from the delay line by the respective synaptic weight, the delay line being configured such that the receipt takes place synchronously for all synaptic weights of the group. A synchronous update of the synaptic weights may shorten the time needed for updating the synaptic weights, and therefore increase the efficiency of the training procedure.

According to embodiments, the method further comprises repeating the method until a first break condition is fulfilled, the first break condition relating to a threshold value for any one of the number of iterations, the cost quantity, or a difference in the cost quantity. This may have the advantage that the cost function can be reduced further with every subsequent iteration. The convergence of the cost function does not necessarily have to be strictly monotonic, particularly if the implemented method does not provide a possibility to set the factor to zero if an update is not feasible. In addition, it must be noted that the group definitions, i.e. the assignment of a particular synaptic weight to a particular group, can vary with each iteration as the groups are redefined not later than after completion of the sequence of groups. Preferably, the at least two groups of synaptic weights in the sequence are disjunct, i.e. no synaptic weight should be newly assigned to a group before the sequence or iteration is completed in order to avoid distortions of the cost function due to multiple updates per iteration.

According to embodiments, the variation is performed simultaneously for all synaptic weights of the group. A simultaneous variation may accelerate the training compared to a sequential variation of the synaptic weight in the group. This effect may be especially pronounced for groups containing a large number of synaptic weights (e.g. if the group is defined as comprising all weights interfacing two subsequent layers of the ANN, the group would contain a typical present day order of 10 synaptic weights, or about 100 synaptic weights if the group comprises all synaptic weights in the ANN).

According to embodiments, the direction of variation is determined randomly for all synaptic weights of the group. Especially for large groups, a randomized parallel (i.e. simultaneous) variation may be faster than a sequential variation. Peculiarities of randomized variation are discussed with FIGS. 5A-5C below.

According to embodiments, the method further comprises repeating the variation for all synaptic weights of the group until a second break condition is fulfilled, the second break condition relating to a threshold value for any one of the number of iterations, the cost quantity, or a difference in the cost quantity. Iterating the variation per group may be beneficial as it may allow for detecting the local minimum of the cost function only for the synaptic weights of that particular group, under the boundary condition that all other synaptic weights in the ANN remain constant. If a local minimum is found, the iterative variation may be performed for the synaptic elements of a different group while all other synaptic elements, including the synaptic elements of the first group, remain constant. During iterative variation of the second group, a second local minimum of the cost function may be found which is lower than the local minimum of the cost function of the variation of the first group.

This way, it may be possible to find a global minimum of the cost function (as defined e.g. using the first break condition) in a shorter time than would be possible by subsequent variation of each group without per group iteration. That is, if a global iteration (first break condition) is used for controlling the variation on global scale, an encapsulated per group iteration may have the beneficial effect that less global iterations are needed to find a global minimum of the cost function. On the other hand, if no global iteration is implemented, said per group iteration may still be beneficial by enabling a detection of a lower minimum than would be possible by subsequent per group variation without per group iteration.

According to embodiments, the direction of variation is equal for all synaptic weights of the group. This may further reduce the time taken for performing the training, since no variation direction patterns need to be tried out. In addition, the hardware level acceleration may be possible with implementations supporting synchronous programming of the synaptic weight elements incorporating the synaptic weights. Another possibility of accelerating the variation this way may become available if the groups are defined such that synaptic weights of similar behavior or impact with respect to the cost function are gathered in the same group. In this case, the response of the cost function to the variation may be especially pronounced because all synaptic weights of similar effect are varied in the same direction together.

In an example, an artificial neural network has the known property that, out of a set of synaptic weights interfacing two subsequent layers of the ANN, all synaptic weights connecting from the same neuron element of the upstream layer have a similar effect on the cost function upon variation in a particular direction. Hence, if said synaptic weights are grouped by the neuron elements of the upstream layer, they should be varied into the same direction to have a constructive effect on the cost function. In the example, the training procedure is shortened because the number of synaptic weights to be varied independently is replaced by the reduced number of groups, wherein each group behaves as an effective synaptic weight.

According to embodiments, the training processing further comprises, in case the second cost value is greater than the first cost value, setting the factor to −1. This may also reduce the time taken for performing the training procedure as it may render a second variation of the synaptic elements in the group unnecessary. Setting the factor to −1 without further investigation of the effect of adjustments to the variation direction on the cost function may be particularly advantageous if the cost function is known to be convex.

According to embodiments, the artificial neural network further comprises a test group of at least one test weight, the method further comprising, for each synaptic weight of the group defined for variation, setting one of the at least one test weight to a value differing from the respective synaptic weight by the weight difference, the variation comprising bypassing the group defined for variation with the test group.

A test group should be an identical copy of the group defined for variation, i.e. it should contain the sub net of identical copies of the synaptic weight elements incorporating the synaptic weights of the group defined for variation, and the copy elements should be interconnected by an identical copy of the network topology which is embedding the synaptic weight elements incorporating the synaptic weights of the group defined for variation. A test group may be implemented as a single synaptic weight adapted for bypassing a single or multiple synaptic weight(s) (e.g. a single test weight per layer to support sequential variation), as a generic test group being an identical copy of a given group (e.g. a generic shadow layer for a multiplicity of identical layers to support parallel variation of all synaptic weights of one layer), as a dedicated test group (e.g. if the groups to be varied differ in topology), etc.

The synaptic weight elements of the test group are programmed with respectively varied synaptic weights while the original synaptic weights of the group defined for variation remain unchanged. In order to check the influence of the varied test weights on the cost function, the network is allowed to detach the input(s) of the group defined for variation from the remaining network and to connect the respective input(s) of the test group so as to reproduce the detached connection of the group defined for variation to the network. This may have the beneficial effect that the original synaptic weights of the group remain available for later processing, and the weight changes applied for variation, or respectively, the individual directions of variation per synaptic weight of the group, may not have to be cached separately.

According to embodiments, the restoration comprises bypassing the test group with the group defined for variation. After completion of the training processing, the network is thus allowed to reconnect the synaptic weight elements of the group defined for variation and detach the test weight elements in order to continue the method with the original values of the synaptic weights of the group defined for variation. This way, a double programming of the synaptic weight elements incorporating the synaptic weights of the group defined for variation may be avoided because only one programming step is needed for the test weight elements and the restoral can be performed by simply switching the network back to the synaptic weight elements defined for variation instead of reprogramming them. The bypassing of the group defined for variation with the test group does not necessarily have to be undone after completion of the variation if it is feasible to keep the varied synaptic test weights instead of the original synaptic weights of the group defined for variation.

The neuromorphic training system disclosed herein comprises a control unit for training the artificial neural network. The control unit is adapted for receiving output signals from the ANN, measuring the cost quantity from the received output or deriving the cost quantity from such measurements, comparing different cost values of the cost quantity, determining, based on such comparison, the desired weight change for a selected weight of the ANN or a group of synaptic weights, and providing the determined desired weight changes to the ANN such that they can be written to the respective synaptic weights. The control unit should comply with the technology used for implementing the ANN, i.e. its components should be of the same e.g. optical, resistive or optoelectronic technology as the components of the ANN.

Main components of the control unit are a measuring means for measuring a quantity which can be interpreted as the cost quantity or from which the cost quantity can be derived, and a logic for comparing measured or derived quantities and/or determining the factor to be used to define a particular desired weight change for a given synaptic weight. The control unit may further comprise a means for caching the measured and/or derived quantities (e.g. one or more memory elements) in order to facilitate the comparison, but it may also make use of caching capabilities (such as memory elements and/or delay lines) provided by the network for that purpose. Optionally, the control unit further comprises a means for reading out a synaptic weight currently present in the network as it may be necessary to take the present state of the synaptic weight into account for determining the desired weight change. Optionally, the control unit may further comprise a means for writing (reprogramming) a synaptic weight, primarily for performing the training by updating the synaptic weights of the group. The control unit may also comprise enhanced caching capabilities to enable a delay between the determination of the desired weight change and the update of the synaptic weight. Using the control unit, the system is adapted for performing the method according to embodiments of the invention.

According to embodiments, the control unit is further adapted for providing a target signal, the cost quantity comprising the squared power difference between the output signal and the target signal. In particular, the control unit may comprise a means for generating the target signal, or it may be adapted for transmitting the target signal from an external source. The target signal is supposed to be equivalent to an ideal output signal of the ANN if the training were already completed. The power of the output signal and the target signal may be an advantageous quantity for determining the error generated by the ANN in its current state which may be measurable precisely and with a low apparative effort. The power difference between the two signals may for instance be determined for each output channel (neuron element) of the ANN. In the ideal case of a perfect training, the output signal would be identical to the target signal and the cost function (or respectively, its components generated by the considered output neuron) would be zero. The squared power difference may therefore be a useful equivalent quantity of the cost function.

According to embodiments, the artificial neural network is implemented as an optical or opto-electronic neural network, the at least one synaptic weight being incorporated by a tunable phase shifter, the control unit being further adapted for generating an interference signal from the output signal and a coherent target signal, the cost quantity comprising the optical power of the interference signal. In an optical or optoelectronic neural network, a setup required for performing the training may be simplified by exploiting the fact that the output signal and the target signal can be brought into interference with each other. The interference signal thus generated comprises amplitude and phase information describing the difference of the two signals, and hence the error generated by the ANN in its current state. An analogy to the power difference between output signal and target signal discussed above, the optical power of the interference signal may therefore be a precise and accessible quantity which allows to determine the cost quantity. The setup may be simplified because a separate or differential measurement of the respective powers of output and target signal is not necessary, and/or the determination of the cost function may be performed in a shorter time as the number of necessary measurements is reduced to one.

According to embodiments, the system is implemented as an integrated optical circuit. This may have the advantage that the hardware implemented training of the artificial neural network has lower requirement for space and/or energy. Furthermore, the manufacturing of the system may be simplified compared to a bulk system, as all components of the system can be manufactured on the same technology node (e.g. silicon photonics).

According to embodiments, at least two synaptic weights are incorporated by tunable phase shifters, at least two of the tunable phase shifters being communicatively coupled to the control unit by a delay line for synchronized update, the control unit being further adapted for caching the respective desired weight change for each of the synchronizedly updatable tunable phase shifters using the delay line, the adding comprising, for each of the synchronizedly updatable tunable phase shifters, receiving the respective cached desired weight change from the respective delay line by the respective synchronizedly updatable tunable phase shifter, the delay line being configured such that the receipt takes place synchronously for all of the at least two synchronizedly updatable tunable phase shifters. Such system may advantageously provide a capability for performing the method with synchronous weight updates as discussed further above. The system according to the described embodiment may therefore be able to perform the hardware implemented training in a shorter amount of time.

According to embodiments, the artificial neural network is implemented as a resistive neural network. This may have the advantage that a large number of highly diversified and sophisticated components are available which may reduce the need for low level manufacturing and the expensive machinery required therefore.

According to embodiments, the artificial neural network further comprises a test group of at least one test weight, the at least one synaptic weight and the at least one test weight being incorporated by resistive memory, each synaptic weight of the group defined for variation being in a unique assignment with one of the at least one test weight, the group defined for variation and the test group having an identical topology, the artificial neural network being further adapted for mutually bypassing the group defined for variation and the test group, the control unit being further adapted for setting, for each synaptic weight of the group defined for variation, the respective assigned test weight to a value differing from the respective synaptic weight by the weight difference, the control unit being further adapted for performing the variation by bypassing the group defined for variation with the test group.

The system according to the described embodiment may beneficially provide the capability for performing the method according to embodiments of the invention described further above where the test group is available as an identical copy of the group defined for variation in order to perform the variation by bypassing the group defined for variation with the test group. Hence, said system may enable performing the method with the reduced time requirement as the synaptic weights can be restored by switching the network from the test group to the group defined for variation instead of reprogramming the synaptic weights of the group defined for variation, and alternatively, as no additional reprogramming is required in case that the synaptic weights of the group defined for variation should be updated before continuing the method.

According to embodiments, the artificial neural network is implemented as a resistive neural network. In an example, the weights are implemented as the resistance states (or conductances) of a phase-change material (PCM), oxide-based resistive memory (OxRAM), conductive-bridge resistive memory (CBRAM), ferroelectric-based resistive or tunnel junction memory (FeRAM), magnetic random access memory (MRAM), or a combination thereof. Said technologies may provide a sufficient degree of technical maturity and application-specific diversification and may therefore reduce the need for developing dedicated hardware in order to implement embodiments of the invention.

According to embodiments, the artificial neural network comprises one of resistive memory, a set of integrated optical devices, or a set of electro-optical devices for incorporating the at least one synaptic weight. Said technologies may provide a sufficient degree of technical maturity and a sufficiently diversified portfolio of constructive elements for implementing embodiments of the invention.

FIG. 1 schematically illustrates for a particular implementation of an optical neural network 100. On the upper left, the map of a miniature artificial neural network 100 is shown, a detail of which is zoomed into at the center of the Fig. The zoomed diagram shows three neuron elements 102 of a hidden layer which are connected each to a node 106 of an output layer. Each connection has a synaptic weight which is encoded by a tunable phase shifting element 104. The output generated by the output node 106 is directed to a detector 108 where it is interfered with a coherent target signal. In the example shown in FIG. 1, a large error may result in a phase shift of the output signal of 180° with respect to the target signal, such that the interference signal has an amplitude of approximately 0. On the other hand, if the error is small, the phase difference will be close to 0, such that the interference signal has an amplitude which is the sum of the amplitudes of output and target signal.

The detector 108 is a part of the control unit and is used to measure the amplitude of the interference signal after execution of the artificial neural network 100. The control unit interprets the observed amplitude of the interference signal in terms of the phase difference between output and target signal to derive the cost function, which is proportional to the squared sign of the phase difference. The first cost value is then cached by the control unit; the variation is applied to the synaptic weights of the group defined for variation (comprising e.g. a single synaptic weight $w_1$), and the cost function is evaluated once more by executing the artificial neural network 100 and observing the amplitude of the interference signal. The control unit compares the two obtained cost values to determine the factor to be multiplied with the predefined weight difference, and thus the direction of update for the varied weight $w_1$. For reference, the true (unknown) curves of the output amplitude as a function of the phase difference encountered over particular value ranges of the three synaptic weights is shown at the bottom. Eventually, the varied weight $w_1$ may be updated by getting added with the desired weight change, or the desired weight change for $w_1$ may be cached by the control unit to perform the weight update at a later time. The method then continues the variation for the other weights $w_2$ and $w_3$ individually or as a group.

Figure 2:
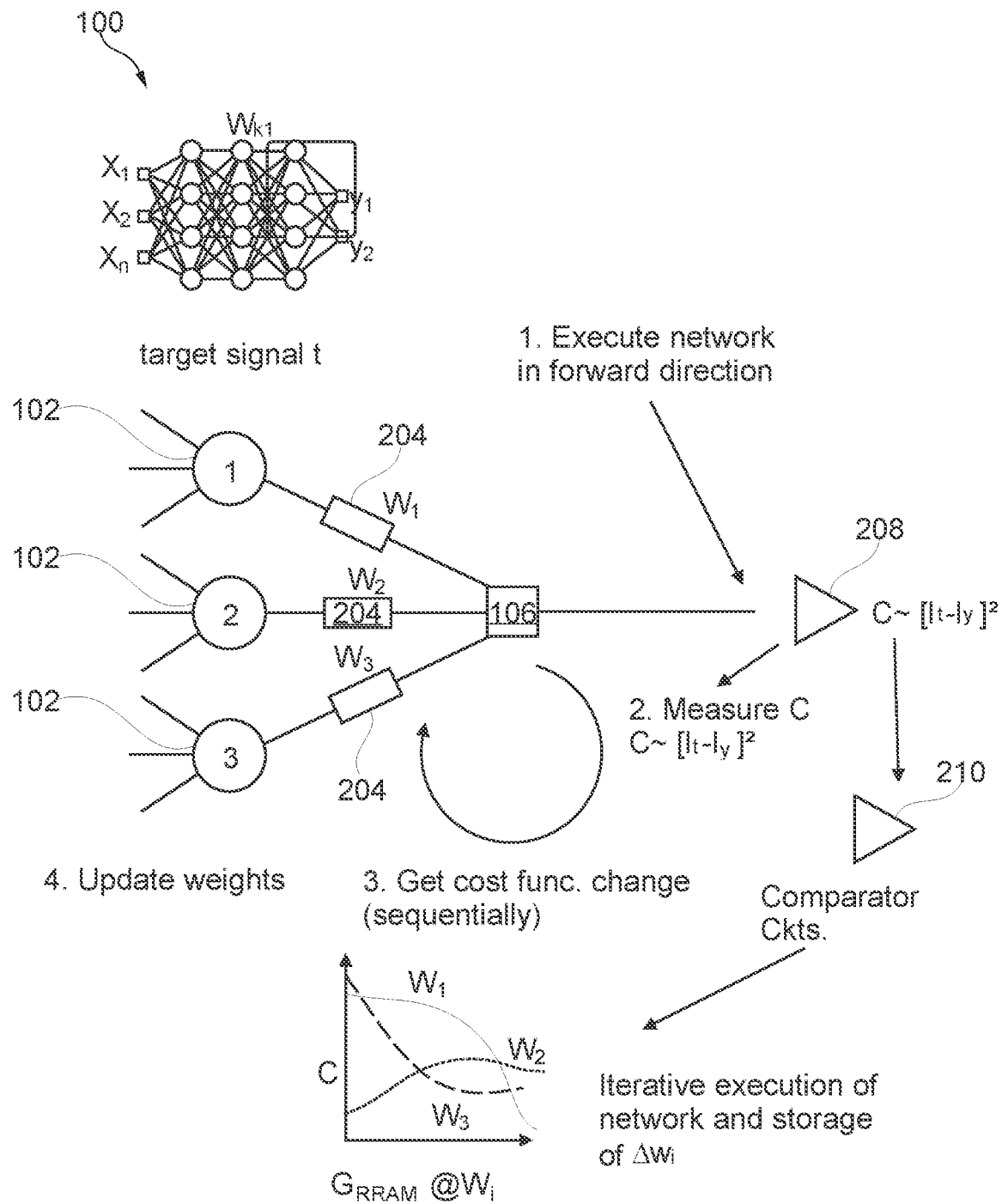
FIG. 2 schematically illustrates the method with a resistive neural network.

FIG. 2 shows a schematic diagram of a miniature resistive neural network 100, a part of which is zoomed into at the center of the Fig. Again, three neuron elements 102 of a hidden layer are connected to one node 106 of the output layer, the connections having synaptic weights $w_1$ to $w_3$ incorporated by reprogrammable resistive synaptic weight elements 204 (e.g. a memory element based on a phase change material, PCM, or an oxide-based resistive memory, OxRAM). Elements of the control unit are implemented as electronic circuits symbolized by operational amplifiers 208, 210. The output generated by the output node 106 is transferred to an analog detection circuitry 208 capable of measuring the output current. The detection circuitry 208 is designed so as to detect the squared current difference between the output current and the target current representing the target signal (not shown in FIG. 2), which is proportional to the segment of the cost function representing the depicted output node 106. The control unit then caches the determined cost value for later evaluation by a comparator circuit 210.

Subsequently, the variation is applied to the synaptic weights. In an example, each synaptic weight is varied by the predefined weight difference in random direction. The artificial neural network 100 is executed again and the second cost value is determined in the same way as the first cost value and cached for comparison by the comparator circuit. The two cached cost values are then compared by the comparator circuit 210 and a logic device (not shown in FIG. 2) uses the result of the comparison to determine the factor of the desired weight change. For reference, the dependence of the cost function on the respective electrical conductivities of the three depicted resistive synaptic weight elements 204 is shown in a schematic diagram at the bottom of FIG. 2. The three varied synaptic weights are then updated with the determined desired weight changes, or the desired weight changes are cached by the control unit for later synaptic weight update. Preferably, the mentioned circuits for current detection, cost value comparison, and logical evaluation are implemented in analog technology to gain a high processing speed.

Figure 3:
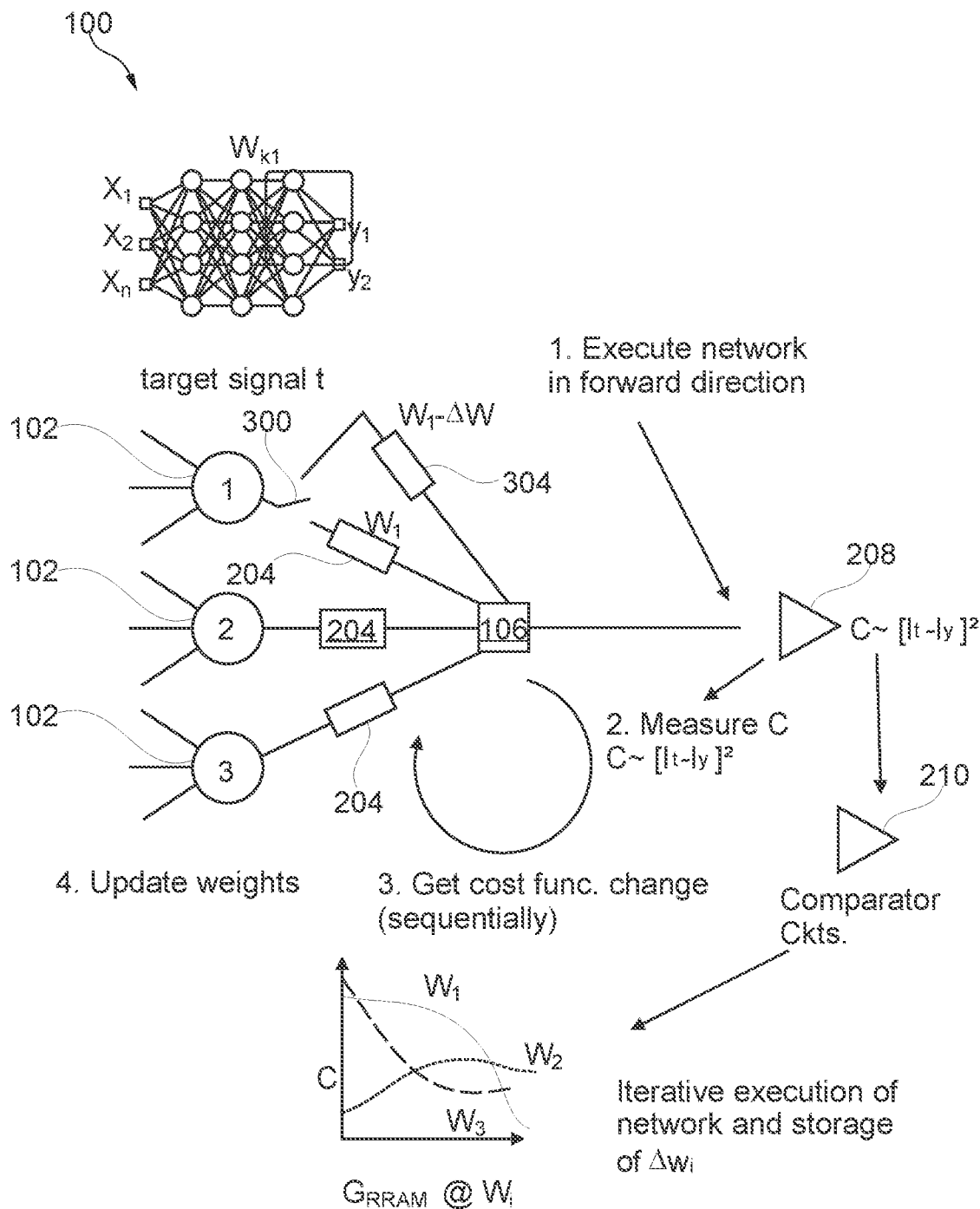
FIG. 3 schematically illustrates the method with a resistive neural network comprising a test group.

FIG. 3 shows another schematic resistive neural network 100, further comprising a test weight element 304 on a parallel network connection between the first node 102 of the hidden layer and the depicted output layer node 106. A switch 300 is installed downstream of the first hidden layer node 102 such that synaptic weight element 204 can be bypassed with the test weight element 304, and vice versa. The depicted schematic shows the network 100 in a state where the first synaptic weight element 204 has been programmed with a synaptic weight $w_1$ and the test weight 304 has been programmed with a synaptic weight of $w_i - \Delta w$. The variation of $w_1$ can then be performed by switching the network 100 from synaptic weight element 204 to test weight element 304. If the original weight $w_1$ is to be restored, the network 100 can be switched from the test weight element 304 to the original weight element 204. If the test weight is to be kept for the further processing of the training, the switch can be allowed to stay in its position bypassing the original weight element 204. This way, the original synaptic weight element 204 does not have to be reprogrammed in order to keep the varied synaptic weight for the further course of the training. On the other hand, if the original weight $w_1$ is to be restored, the ability to switch back to the original weight element 204 may reduce the complexity of the setup which would otherwise be necessary to provide the capability to restore the original synaptic weight (e.g. a cache for the original synaptic weight, the predefined weight difference, and/or the direction of variation).

It is understood that the diagrams of FIGS. 1-3 are merely illustrative examples selected to provide an easy understanding of the invention. Material implementations of embodiments may have a greatly enhanced complexity, where, for instance, the artificial neural network comprises hundreds of neuron elements, each of which having numerous interconnections with neuron elements of adjacent layers and/or beyond, a larger number of layers, additional network layers in a third or higher dimension, etc.

Figure 4A:
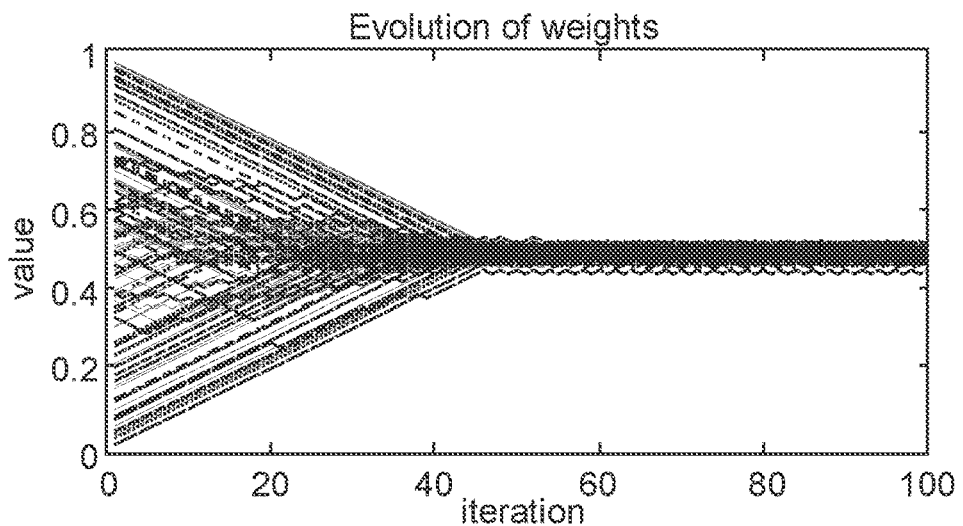
FIGS. 4A-4C are diagrams illustrating sequential weight variation with a simulated artificial neural network.
Figure 4B:
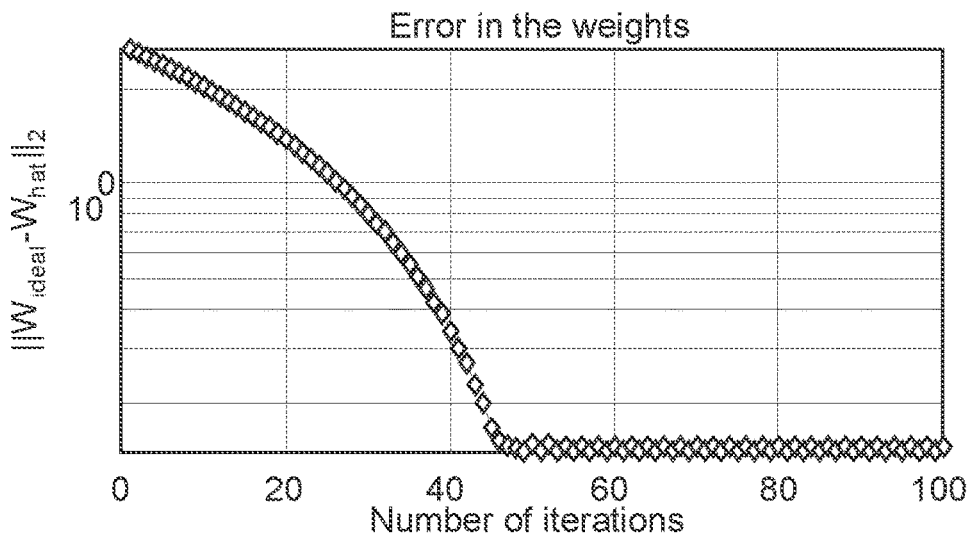
Figure 4C:
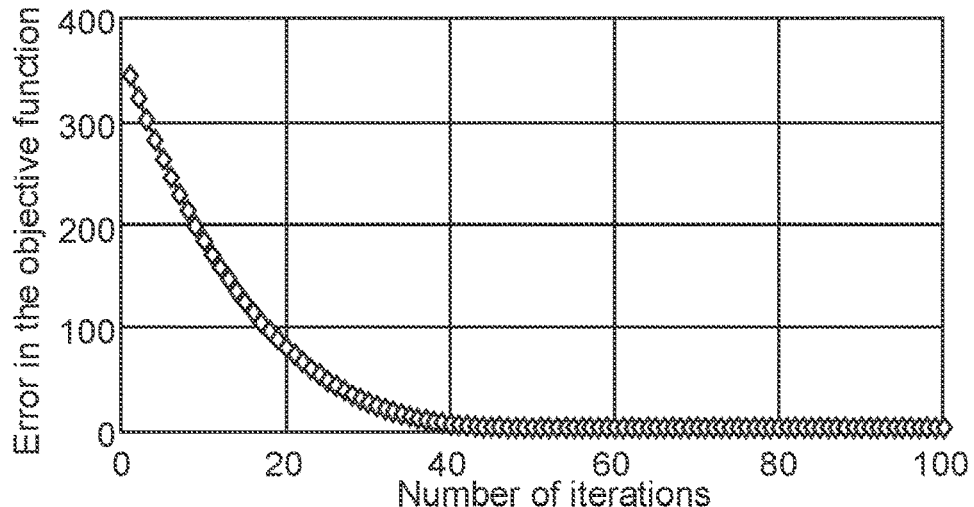

FIGS. 4A-4C show diagrams generated from data of a simulation where sequential variation according to embodiments of the invention was applied to an artificial neural network comprising 100 synaptic weights. During each iteration, the synaptic weights were varied one by one and the update was performed after completion of the 100 separate variation steps. Initially, the 100 weights were prepared to a roughly homogeneous distribution of values between 0 and 1. The evolution of the synaptic weights over 100 iterations is shown in FIG. 4A. It can be seen that convergence towards a narrow range around 0.5 is achieved after about 45 iterations. FIG. 4B shows an average error of the weights with respect to an ideal distribution in a half logarithmic plot over the number of iterations. The error figure steadily drops from an initial value of above 2 towards the order of 0.1, with increasing logarithmic steepness until convergence is reached after 45 iterations. FIG. 4C shows a roughly exponential drop of the cost function from about 350 at the beginning down to values slightly above 0 after not more than 50 iterations. FIGS. 4A-4C demonstrate the effectiveness of the method according to embodiments of the invention. For comparison, an analogous simulation was conducted for a conventional back propagation/gradient descent algorithm, which reached convergence (weight error close to 0.1) after about 100 iterations. The gradient descent simulation was conducted with the same model artificial neural network as the simulation of FIGS. 4A-4C.

Figure 5A:
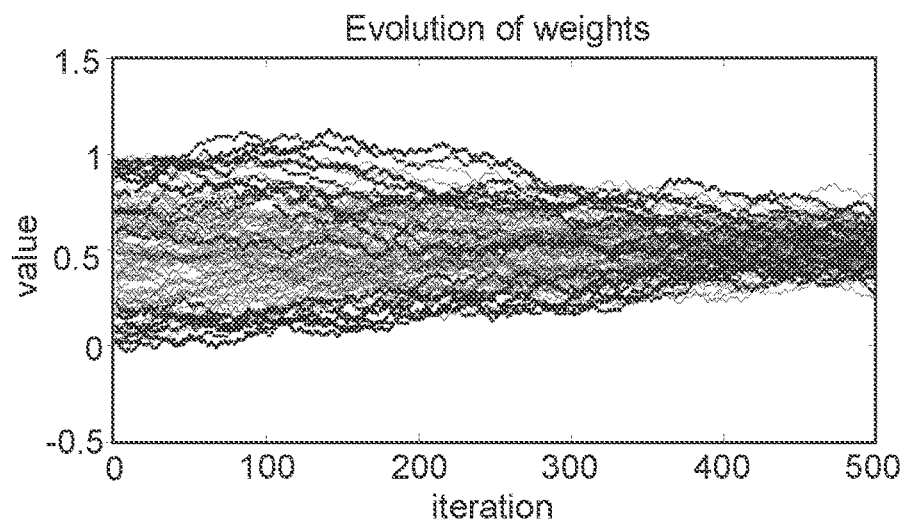
FIGS. 5A-5C are diagrams illustrating randomized parallel weight variation with a simulated artificial neural network.
Figure 5B:
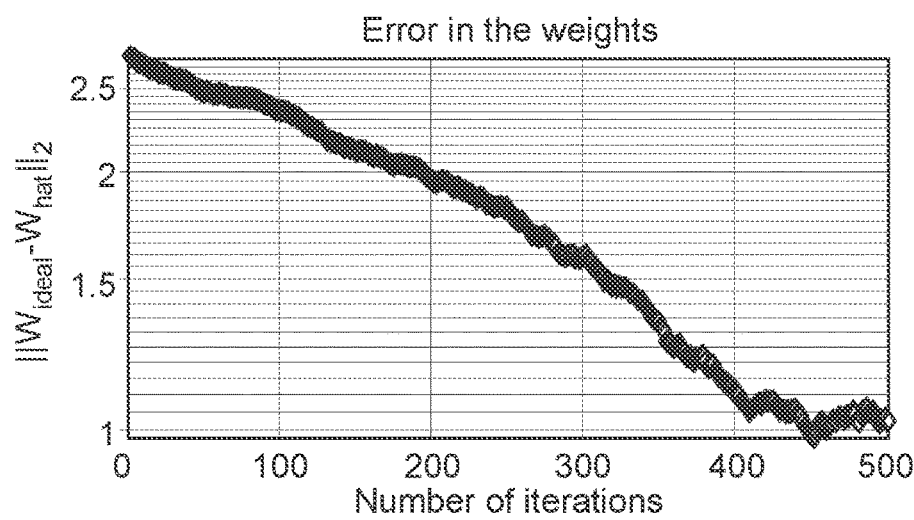
Figure 5C:
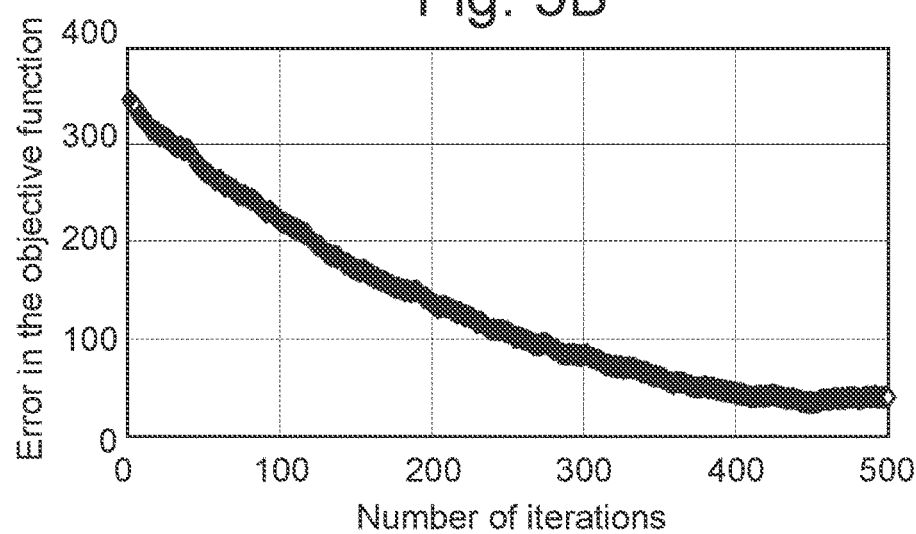

FIGS. 5A to 5C show diagrams obtained from an analogous simulation of the same ANN with 100 synaptic weights, where parallel variation with randomized variation direction according to embodiments of the invention was applied. FIG. 5A shows the evolution of synaptic weights over 500 iterations, starting again with a near-homogeneous value distribution. It can be seen that the narrow convergence range of FIG. 4A is very slowly approached, but not reached. Numerous weights show random walks with a temporarily diverging trend, with typically about 50 iterations to evolve in diverging direction and 50 to recover into a previous value range. However, a consolidation with decreasing spread is observed.

FIG. 5B shows the evolution of the mean weight error in a half logarithmic plot over the 500 iterations. The error drops with slightly increasing steepness from about 2.7 and enters into stagnation slightly above 1.0 after about 400 iterations. The cost function, depicted in the diagram of FIG. 5C, drops with slightly decreasing steepness from about 350 to a narrow range around 50 from iteration 400 onward. It follows that the fast (in terms of the number of iterations) and good (in terms of residual error) convergence of the simulation with sequential variation (FIGS. 4A to 4C) can probably not be reached with randomized variation, but especially for large networks, randomized variation might still be faster due to parallelization.

Hence, randomized parallel variation may be a beneficial choice for large networks where quality of training convergence does not have the highest priority. Otherwise, it is still possible to switch from parallel randomized variation to sequential variation, e.g. after parallel sequential variation causes the error to drop below a certain predefined threshold value or if a stagnation criterion is reached, and to continue with sequential variation with a reduced number of iterations (compared to purely sequential iteration from the beginning) to improve convergence further. With this combined parallel/sequential approach, the training may be completed in shorter time compared to purely sequential variation.

The invention claimed is:

1. A method for hardware-implemented training of a feedforward artificial neural network, the method comprising:
generating a first output signal of the artificial neural network by processing an input signal with the artificial neural network, the first output signal causing a cost quantity of the artificial neural network to assume a first cost value;
measuring the first cost value;
defining a group of at least one synaptic weight of the artificial neural network for variation;
varying each synaptic weight of the group by a predefined weight difference;
after the variation, generating a second output signal of the artificial neural network by repeating the processing of the input signal, the second output signal causing the cost quantity to assume a second cost value;
measuring the second cost value;
comparing the second cost value to the first cost value; and
executing a training processing, the training processing comprising determining, based on the comparison, a desired weight change for each synaptic weight of the group such that the cost function does not increase in response to, for each synaptic weight of the group, the respective desired weight change being added to the synaptic weight, the desired weight change being based on a product of a factor and the weight difference, the factor being either −1, 0, or +1;
wherein at least two synaptic weights are incorporated by tunable phase shifters, at least two of the tunable phase shifters being communicatively coupled to the control unit by a delay line for synchronized update, the control unit being further adapted for caching the respective desired weight change for each of the synchronizedly updatable tunable phase shifters using the delay line, the adding comprising, for each of the synchronizedly updatable tunable phase shifters, receiving the respective cached desired weight change from the respective delay line by the respective synchronizedly updatable tunable phase shifter, the delay line being configured such that the receipt takes place synchronously for all of the at least two synchronizedly updatable tunable phase shifters.

2. The method of claim 1, the training being performed for a sequence of at least two groups of synaptic weights, the sequence being defined such that the variation of the synaptic weights of a group subsequent to a given group is performed after the execution of the training processing for the synaptic weights of the given group, the training processing further comprising, for each synaptic weight of the group:
in case the second cost value is smaller than the first cost value, setting the factor to +1;
caching the respective desired weight change; and
restoring the respective synaptic weight,
the method further comprising, upon completion of the training processing for all synaptic weights of the group, adding the determined desired weight change to the respective synaptic weight for each synaptic weight of the group.

3. The method of claim 2, the adding being delayed until the training processing is completed for the last group in the sequence.

4. The method of claim 2, the training processing further comprising, in case the second cost value is not smaller than the first cost value:
for each synaptic weight of the group, varying the respective restored synaptic weight by the predefined weight difference in negative direction;
generating a third output signal of the artificial neural network by repeating the processing of the input signal, the third output signal causing the cost quantity to assume a third cost value;
measuring the third cost value;
in case the third cost value is smaller than the first cost value, setting the factor to −1 for each synaptic weight of the group; and
in case the third cost value is not smaller than the first cost value, setting the factor to zero for each synaptic weight of the group.

5. The method of claim 2, the caching being performed using a delay line, the adding comprising receiving the cached desired weight change from the delay line by the respective synaptic weight, the delay line being configured such that the receipt takes place synchronously for all synaptic weights of the group.

6. The method of claim 2, further comprising repeating the method until a first break condition is fulfilled, the first break condition relating to a threshold value for any one of the number of iterations, the cost quantity, or a difference between the cost quantity at one of the number of iterations, and the cost quantity at another one of the number of iterations.

7. The method of claim 1, the variation being performed simultaneously for all synaptic weights of the group.

8. The method of claim 7, further comprising repeating the variation for all synaptic weights of the group until a second break condition is fulfilled, the second break condition relating to a threshold value for any one of the number of iterations, the cost quantity, or a difference between the cost quantity at one of the number of iterations, and the cost quantity at another one of the number of iterations.

9. The method of claim 7, the direction of variation being determined randomly for all synaptic weights of the group.

10. The method of claim 1, the direction of variation being equal for all synaptic weights of the group.

11. The method of claim 1, the training processing further comprising, in case the second cost value is greater than the first cost value, setting the factor to −1.

12. The method of claim 1, the artificial neural network further comprising a test group of at least one test weight, the method further comprising, for each synaptic weight of the group defined for variation, setting one of the at least one test weight to a value differing from the respective synaptic weight by the weight difference, the variation comprising bypassing the group defined for variation with the test group.

13. The method of claim 12, a restoration comprising bypassing the test group with the group defined for variation.

14. A neuromorphic training system, the system comprising a feedforward artificial neural network and a control unit for training the artificial neural network, the control unit comprising at least one memory element, the control unit being communicatively coupled to an output of the artificial neural network and being adapted for performing the following:
  receiving a first output signal from the output, the first output signal being generated by processing an input signal with the artificial neural network, the first output signal causing a cost quantity of the artificial neural network to assume a first cost value;
  measuring the first cost value;
  defining a group of at least one synaptic weight of the artificial neural network for variation;
  varying each synaptic weight of the group by a predefined weight difference;
  after the variation, receiving a second output signal from the output, the second output signal being generated by repeating the processing of the input signal, the second output signal causing the cost quantity to assume a second cost value;
  measuring the second cost value;
  comparing the second cost value to the first cost value; and
  executing a training processing, the training processing comprising determining, based on the comparison, a desired weight change for each synaptic weight of the group such that the cost function does not increase in response to, for each synaptic weight of the group, the respective desired weight change being added to the synaptic weight, the desired weight change being based on a product of a factor and the weight difference, the factor being either −1, 0, or +1;
  wherein at least two synaptic weights are incorporated by tunable phase shifters, at least two of the tunable phase shifters being communicatively coupled to the control unit by a delay line for synchronized update, the control unit being further adapted for caching the respective desired weight change for each of the synchronizedly updatable tunable phase shifters using the delay line, the adding comprising, for each of the synchronizedly updatable tunable phase shifters, receiving the respective cached desired weight change from the respective delay line by the respective synchronizedly updatable tunable phase shifter, the delay line being configured such that the receipt takes place synchronously for all of the at least two synchronizedly updatable tunable phase shifters.

15. The system of claim 14, the control unit being further adapted for providing a target signal, the cost quantity comprising the squared power difference between the output signal and the target signal.

16. The system of claim 14, the artificial neural network being implemented as an optical or opto-electronic neural network, the control unit being further adapted for generating an interference signal from the output signal and a coherent target signal, the cost quantity comprising the optical power of the interference signal.

17. The system of claim 16, being implemented as an integrated optical circuit.

18. The system of claim 14, the artificial neural network being implemented as a resistive neural network.

19. The system of claim 18, the artificial neural network further comprising a test group of at least one test weight, the at least one synaptic weight and the at least one test weight being incorporated by resistive memory, each synaptic weight of the group defined for variation being in a unique assignment with one of the at least one test weight, the group defined for variation and the test group having an identical topology, the artificial neural network being further adapted for mutually bypassing the group defined for variation and the test group, the control unit being further adapted for setting, for each synaptic weight of the group defined for variation, the respective assigned test weight to a value differing from the respective synaptic weight by the weight difference, the control unit being further adapted for performing the variation by bypassing the group defined for variation with the test group.

* * * * *